United States Patent
Yamazaki

(10) Patent No.: US 8,335,375 B2
(45) Date of Patent: Dec. 18, 2012

(54) IMAGE PROCESSING APPARATUS AND CONTROL METHOD THEREOF

(75) Inventor: Taeko Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 12/754,355

(22) Filed: Apr. 5, 2010

(65) Prior Publication Data

US 2010/0260412 A1  Oct. 14, 2010

(30) Foreign Application Priority Data

Apr. 13, 2009 (JP) ................. 2009-097395
Mar. 29, 2010 (JP) ................. 2010-076204

(51) Int. Cl.
G06K 9/36 (2006.01)

(52) U.S. Cl. ......... 382/166; 382/162; 382/164; 382/165

(58) Field of Classification Search .......... 382/162, 382/164, 165, 170, 173, 274, 166; 348/296, 348/297, 241, 229.1; 358/451; 345/660
See application file for complete search history.

(56) References Cited

U.S. PATENT DOCUMENTS

| | | | |
|---|---|---|---|
| 7,496,228 B2 * | 2/2009 | Landwehr et al. | ............ 382/170 |
| 7,916,951 B2 * | 3/2011 | Landwehr et al. | ............ 382/224 |
| 8,139,858 B1 * | 3/2012 | Landwehr et al. | ............ 382/170 |

FOREIGN PATENT DOCUMENTS

| | | |
|---|---|---|
| JP | 2004-336211 | 11/2004 |
| JP | 2006-333175 | 12/2006 |
| WO | 2006-066325 | 6/2006 |

OTHER PUBLICATIONS

T. Watanabe, "A Fast Algorithm for Color Image Quantization Using Only 256 Colors", The Transactions of the Institute of Electronics, Information and Communication Engineers, vol. 70 No. 4, pp. 720-726, 1987.
U.S. Appl. No. 12/793,477, filed Jun. 3, 2010. Applicant: Taeko Yamazaki.
U.S. Appl. No. 12/754,369, filed Apr. 5, 2010. Applicant: Taeko Yamazaki.

* cited by examiner

*Primary Examiner* — Anh Hong Do
(74) *Attorney, Agent, or Firm* — Fitzpatrick, Cella, Harper & Scinto

(57) ABSTRACT

In order to implement color-reduction processing more suitable, an image processing apparatus includes a reduced-scale image generation unit configured to generate a reduced-scale image of first image data; a color space division unit configured to determine a plurality of bins by dividing predetermined color space; a first frequency distribution generation unit configured to generate a first frequency distribution for all pixels; a detection unit configured to detect an edge region from the first image data; a second frequency distribution generation unit configured to generate a second frequency distribution for pixels included in the edge region; a determination unit configured to select N bins, and to determine N types of pixel values respectively corresponding to the selected N bins; and a substitution unit configured to substitute each of pixels included in the first image data using the determined N types of pixel values.

11 Claims, 9 Drawing Sheets

IN CASE OF FIXED COLOR DIVISIONS

F I G. 10

1000A color# 8 6

| | Y0 | Y1 | Y2 | Y3 | Y4 | Y5 | Y6 | Y7 |
|---|---|---|---|---|---|---|---|---|
| H0 | 0 | 206 | 43 | 39 | 65 | 72 | 0 | 565 |
| H1 | 0 | 0 | 34 | 0 | 0 | 0 | 0 | 0 |
| H2 | 0 | 0 | 0 | 0 | 0 | 0 | 0 | 0 |
| H3 | 0 | 0 | 0 | 0 | 0 | 0 | 0 | 0 |
| H4 | 0 | 0 | 0 | 0 | 0 | 0 | 0 | 0 |

1000B

Edge# 8 6

| | Y0 | Y1 | Y2 | Y3 | Y4 | Y5 | Y6 | Y7 |
|---|---|---|---|---|---|---|---|---|
| H0 | 0 | 248 | 135 | 145 | 189 | 160 | 0 | 76 |
| H1 | 0 | 0 | 36 | 0 | 0 | 0 | 0 | 0 |
| H2 | 0 | 0 | 0 | 0 | 0 | 0 | 0 | 0 |
| H3 | 0 | 0 | 0 | 0 | 0 | 0 | 0 | 0 |
| H4 | 0 | 0 | 0 | 0 | 0 | 0 | 0 | 0 |

IN CASE OF QUANTIZATION
USING TOP THREE COLORS

IMAGE PROCESSING APPARATUS AND CONTROL METHOD THEREOF

BACKGROUND OF THE INVENTION

1. Field of the Invention

The present invention relates to a color-reduction processing technique of a color image.

2. Description of the Related Art

In recent years, along with digitization of information, a system in which a paper document is scanned by, for example, a scanner so it may be converted into digital data, while the digital data is stored or transmitted to another apparatus without being preserved intact has prevailed. Also, colors used in a document itself transit from monochrome binary values to color values (multi-values). A digital document is required to clearly reproduce characters and a background comprised of a uniform color, so as to attain high readability and compression. However, upon digitizing a paper document in practice, various kinds of noise, blurring, and nonuniformity are generated. In particular, since the nonuniformity and blurring of color regions of a color document adversely influence readability and image quality, color-reduction processing is executed by selecting representative colors from the image.

Watanabe "A Fast Algorithm for Color Image Quantization Using Only 256 Colors", The Transactions of the Institute of Electronics, Information and Communication Engineers 70(4), pp. 720-726, 1987-04 (non-patent literature 1) discloses a method of color-reducing an input image to a 256-color image. An RGB color space is divided into 4×4×4 cube areas, and a color occurrence frequency distribution (histogram) for each of the 4×4×4 cube areas is calculated by referring to the upper 2 bits of an input digital color signal (8 bits for each of RGB (red, green, and blue) signals). Next, variance values are calculated for each of the 64 cube areas, and each of 32 cube areas having the large variance is divided into two. Furthermore, an operation for calculating variance values of the divided areas and dividing the areas having large variance into two is repeated until the number of areas reaches 256. Furthermore, the average colors calculated from each of the divided 256 areas are determined as representative colors.

International Publication WO2006/066325 (patent literature 1) discloses a technique that divides an input image into a plurality of blocks, and performs color substitution for respective blocks. Furthermore, Japanese Patent Laid-Open No. 2006-333175 (patent literature 2) discloses a technique that applies region recognition to the entire page, and executes color-reduction processing using the predetermined number of colors for each attribute such as "text" or "photo" after the recognition result is stored.

However, the color-reduction method described in non-patent literature 1 comes to have much computational complexity because the variance calculation process and the color space division process must be executed repeatedly. Since an RGB color space is used, and variances of respective color components are calculated for each of areas, complicated calculations are required. Patent literature 1 executes color reduction for each tile so as to hold color information of a local region. However, since a small region of interest is set at the time of color reduction, and color information of the small region is left, the technique disclosed in this literature is susceptible to the influence of noise such as color blurring. Hence, in order to remove noise, a histogram is generated to apply color quantization processing, and noise is determined by checking the shapes and generated positions of quantized regions. Then, a histogram is generated again to apply quantization processing. That is, since a plurality of times of histogram calculations with large computation volumes are required, computation cost increases. Furthermore, patent literature 2 executes color-reduction processing after the region recognition is applied to the entire page. For this reason, the recognition result has to be stored on a memory. The technique disclosed in this literature allows easy software implementation, but it is not suited to hardware implementation based on parallel processing and sequential processing.

SUMMARY OF THE INVENTION

The present invention provides a technique that can determine representative colors based on more suitable division process.

According to one aspect of the present invention, an image processing apparatus comprises: a reduced-scale image generation unit configured to generate a reduced-scale image of first image data; a color space division unit configured to determine a plurality of bins by dividing predetermined color space, the plurality of bins being used for generating frequency distributions; a first frequency distribution generation unit configured to generate, for all pixels included in the reduced-scale image, a first frequency distribution by counting a number of pixels that belong to each of the bins determined by the color space division unit; a detection unit configured to detect an edge region from the first image data; a second frequency distribution generation unit configured to generate, for pixels included in the edge region detected by the detection unit, a second frequency distribution by counting a number of pixels that belong to each of the bins determined by the color space division unit; a determination unit configured to select N bins based on the generated first frequency distribution and the generated second frequency distribution, and configured to determine N types of pixel values respectively corresponding to the selected N bins; and a substitution unit configured to substitute each of pixels included in the first image data using the determined N types of pixel values.

According to another aspect of the present invention, a method of controlling an image processing apparatus, the method comprises: a reduced-scale image generation step of generating a reduced-scale image of first image data; a color space division step of determining a plurality of bins by dividing predetermined color space, the plurality of bins being used for generating frequency distributions; a first frequency distribution generation step of generating, for all pixels included in the reduced-scale image, a first frequency distribution by counting a number of pixels that belong to each of the bins determined in the color space division step; a detection step of detecting an edge region from the first image data; a second frequency distribution generation step of generating, for pixels included in the edge region detected in the detection step, a second frequency distribution by counting a number of pixels that belong to each of the bins determined in the color space division step; a determination step of selecting N bins based on the generated first frequency distribution and the generated second frequency distribution, and of determining N types of pixel values respectively corresponding to the selected N bins; and a substitution step of substituting each of pixels included in the first image data using the determined N types of pixel values.

According to the present invention, the technique that can attain color-reduction processing more suitable for a color document image can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view showing examples of generated frequency distribution data;

DESCRIPTION OF THE EMBODIMENTS

Preferred embodiments of the present invention will be described in detail hereinafter with reference to the drawings. Note that the following embodiments are presented for the exemplary purpose only, and do not limited the scope of the present invention.

First Embodiment

An image processing system including an image processing apparatus and personal computer (to be referred to as a PC hereinafter), which are connected to each other via a network, will be exemplified below as the first embodiment of an image processing apparatus according to the present invention.

<System Arrangement>

Figure 1:
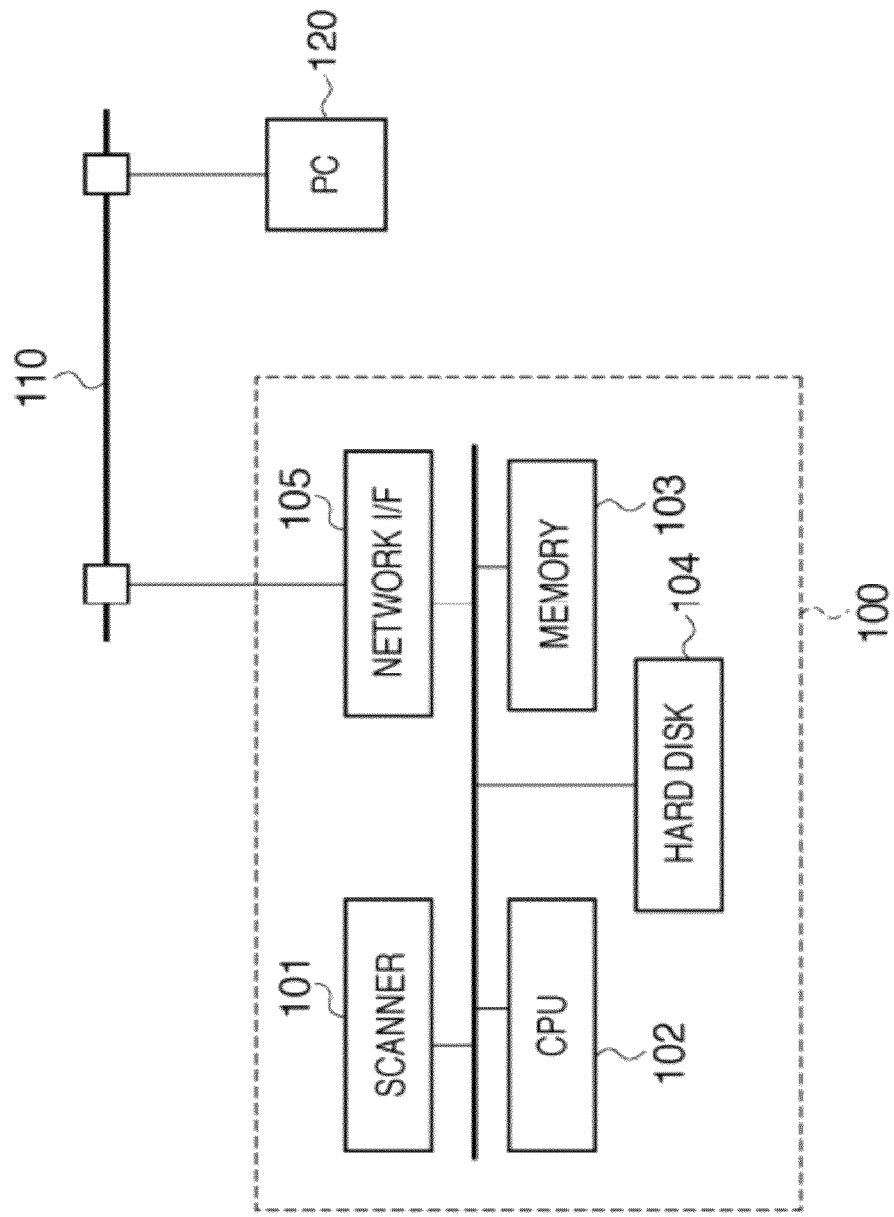
FIG. 1 is a block diagram showing the overall arrangement of an image processing system according to the first embodiment.

FIG. 1 is a block diagram showing the overall arrangement of an image processing system according to the first embodiment. Reference numeral 100 denotes an image processing apparatus which includes a scanner 101 used to generate image data by reading a document image, and a network I/F 105 used to exchange data with an external apparatus. A personal computer (to be referred to as a PC hereinafter) 120 is connected to the image processing apparatus 100 via a network such as a LAN 110, and receives data transmitted from the image processing apparatus 100.

The image processing apparatus 100 includes a CPU 102 that executes a program required to apply image processing to image data acquired by the scanner 101 or from an external apparatus via the network I/F 105. Furthermore, the image processing apparatus 100 includes a memory 103 which is used as a work memory upon execution of the program, and to temporarily store data, and a hard disk 104 that stores programs and data.

Figure 2:
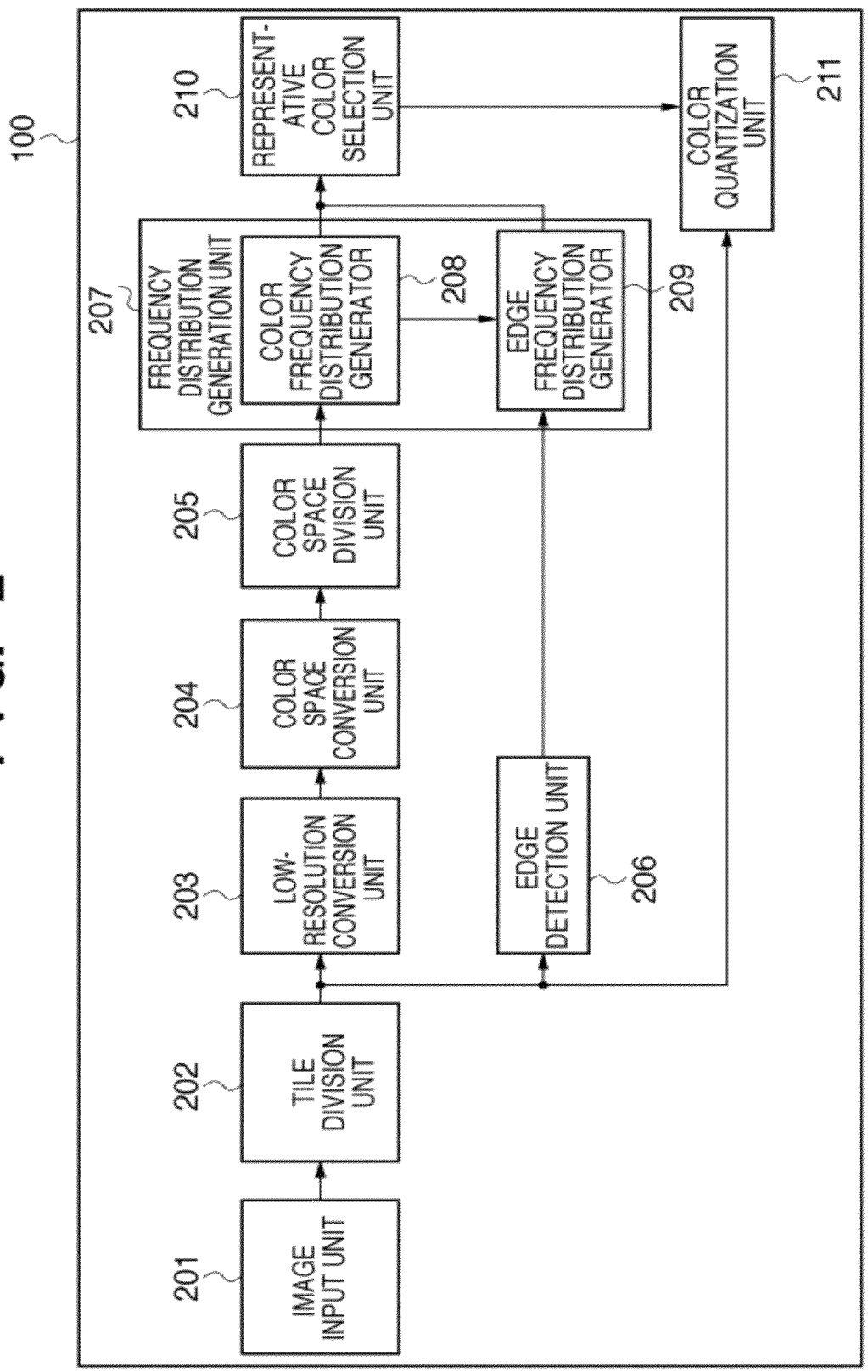
FIG. 2 is a functional block diagram of an image processing apparatus 100 according to the first embodiment.

FIG. 2 is a block diagram showing the functional arrangement of the image processing apparatus 100 according to the first embodiment. Assume that processing units to be described below are implemented when the CPU 102 executes various processing programs. However, some or all of these processing units may be configured using an electric circuit (for example, ASIC).

Reference numeral 201 denotes an image input unit which inputs image data acquired by the scanner 101 or from an external apparatus via the network I/F 105. In the following description, assume that input image data (first image data) is a color image that is expressed on an RGB color space and is generated to have a resolution of 600 dpi. Note that a pixel value can assume 24-bit (8 bits per color) types (i.e. 2^24 types (M types)) of values.

Figure 3:
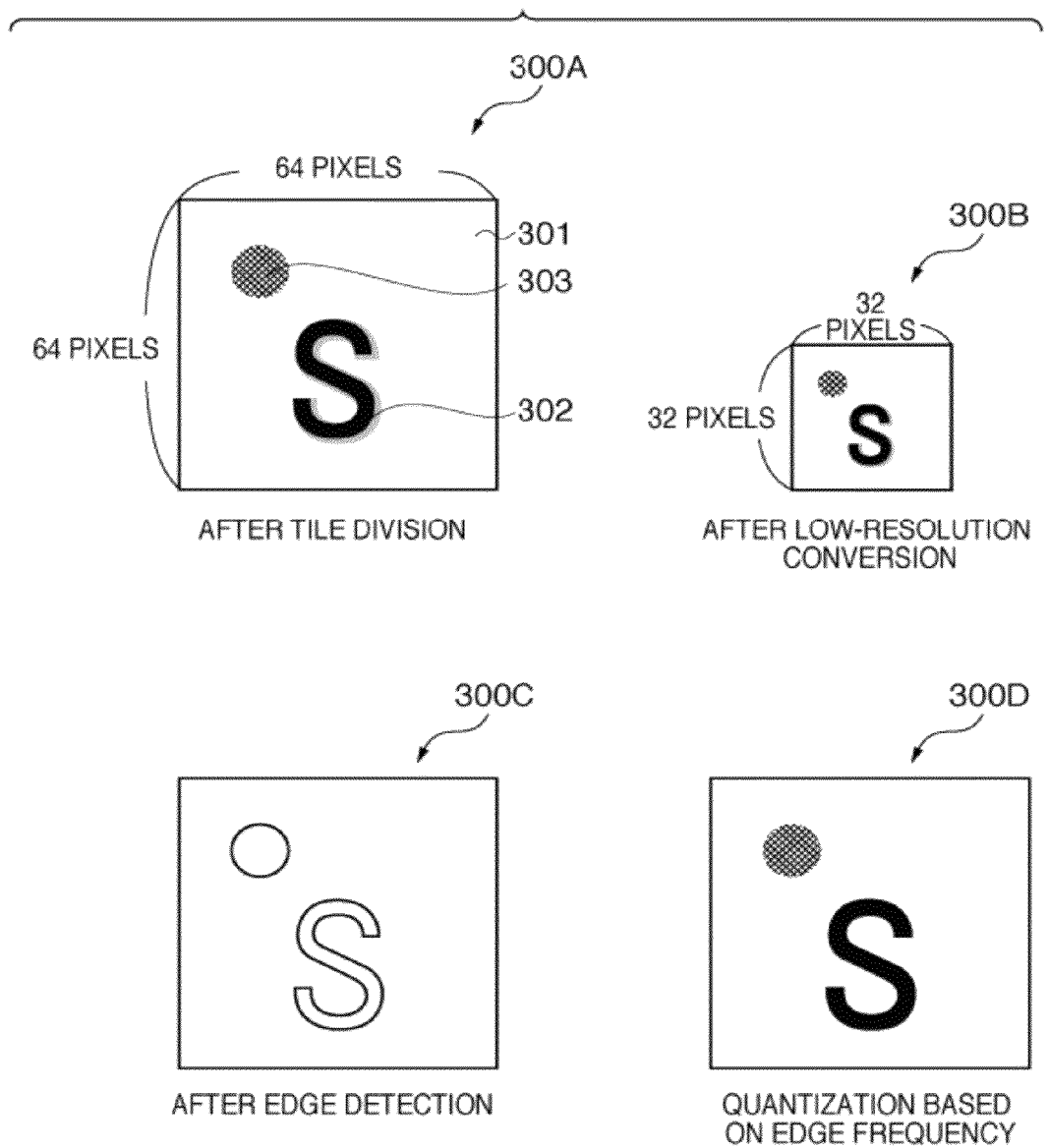
FIG. 3 is a view for explaining processes applied to image data.

Reference numeral 202 denotes a tile division unit that divides image data input by the image input unit 201 into a plurality of tile images each having a predetermined size. In FIG. 3, reference numeral 300A denotes one tile image obtained by dividing an input image input from the image input unit 201 into tile images each having a size of 64 pixels×64 pixels. Assume that regions 301, 302, and 303 in the tile image have different color information values, and the boundary portion of the region 302 is blurred. The blur is derived from that which originally exists in a document image or is generated at the time of reading a document image by the scanner 101. Also, assume that the region 301 is a white background region, the region 302 is a black character region, and the region 303 is a reddish image region. And assume that a gray blur region occurs around the black character region 302.

Reference numeral 203 denotes a low-resolution conversion unit, which converts each tile image divided by the tile division unit 202 into a low-resolution image. The low-resolution conversion can remove noise components of the input image, and can also reduce the number of pixels to be processed in generation processing of color frequency distributions (to be described later), thus reducing the processing load. In this embodiment, resolution conversion from 600 dpi to 300 dpi (i.e., to a ½ resolution) using an averaging filter of 2×2 surrounding pixels will be exemplified. Note that this embodiment uses the averaging filter of 2×2 pixels. Alternatively, an arbitrary reduced-scale image generation method such as an averaging filter of L×L pixels (L is an integer) may be used. Note that it is desirable to confine reduction to a degree at which thin lines and characters included in input image data can be prevented from being garbled. In FIG. 3, reference numeral 300B denotes a low-resolution image obtained by converting the tile image 300A. In this embodiment, the tile image is converted into an image having a size of 32 pixels×32 pixels.

Figure 4:
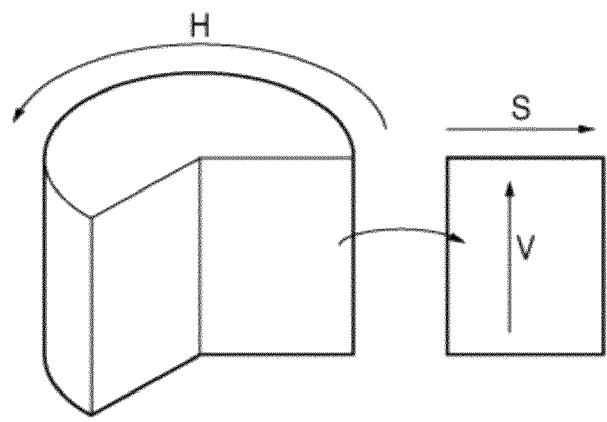
FIG. 4 is a view for explaining an HSV color space.

Reference numeral 204 denotes a color space conversion unit, which derives hue (H) and saturation (S) values of an HSV color space and a luminance (Y) value of a YUV color space from RGB pixel values corresponding to respective pixels of the low-resolution image data. The HSV color space is explained as a cylinder defined by Hue, Saturation, and Value, as shown in FIG. 4. A radius direction corresponds to saturation S, which is expressed by a value ranging from 0 to 1 corresponding to distances from the center line of the cylinder. The center (S=0) of a circle corresponds to an achromatic color, and a position farther from the center (a value closer to 1) corresponds to a more brilliant chromatic color. Hue H corresponds to the circumferential direction (angular direction of the circle), and is expressed by a value ranging from 0° to 360°. For example, H=0° corresponds to a reddish color, H=120° corresponds to a greenish color, and H=240° corresponds to a bluish color. Value V indicates the brightness of a color, and is expressed by a value ranging from 0 to 100 (%). A color becomes brighter with increasing value. Note that V=0% corresponds to black, and V=100% corresponds to white.

Letting MAX be a maximum value of RGB pixel values (R, G, B) and MIN be a minimum value, respective values of HSV pixel values (H, S, V) are calculated by:

$$H=60\times(G-B)/(MAX-MIN)+0 \text{ if } MAX=R$$

$$H=60\times(B-R)/(MAX-MIN)+120 \text{ if } MAX=G$$

$$H=60\times(R-G)/(MAX-MIN)+240 \text{ if } MAX=B$$

$$S=(MAX-MIN)/MAX$$

$$V=MAX$$

Note that luminance Y of a YUV color space is closer to brightness perception by a human eye than value V of the HSV color space. For this reason, the first embodiment uses Y of the YUV color space as the brightness information of a color in place of value V of the HSV color space. I.e. the first embodiment uses the hue (H) and saturation (S) values of the HSV color space and the luminance Y of the YUV color space. A color space defined by the hue, saturation, and luminance will be referred to as a Y/HS color space hereinafter.

Note that a value of luminance Y is calculated from RGB pixel values (R, G, B) by:

$$Y=0.29891\times R+0.58661\times G+0.11448\times B$$

Reference numeral 205 denotes a color space division unit which divides the Y/HS color space into a plurality of partial spaces so as to determine a plurality of bins used to generate frequency distribution information in a frequency distribution generation unit 207 (to be described later). Details of the color space division method will be described later. Reference numeral 207 denotes a frequency distribution generation unit that includes a color frequency distribution generator 208 (first frequency distribution derivation unit) and edge frequency distribution generator 209 (second frequency distribution derivation unit). Details of the frequency distribution information generation method will be described later.

Reference numeral 206 denotes an edge detection unit that extracts an edge region included in each tile image divided by the tile division unit 202 using a known edge region detection technique. More specifically, the edge detection unit 206 extracts, as an edge region, a region including a large pixel value change in the input image using, for example, a Laplacian edge filter. For example, the edge detection unit 206 outputs, for each pixel, a signal "1" for a strong edge magnitude portion and "0" for other portions. In FIG. 3, reference numeral 300C denotes an image of signals obtained by extracting edges from the tile image 300A. In FIG. 3, an edge portion is indicated by black (signal "1"), and a non-edge portion is indicated by white (signal "0").

Reference numeral 210 denotes a representative color selection unit, which determines representative colors (e.g. three types of representative colors) based on information generated by the frequency distribution generation unit 207. Reference numeral 211 denotes a color quantization unit that generates color-reduced image data (second image data) by executing quantization processing for substituting the determined representative colors for pixel values of pixels of input image data. In this case, assume that three types (N types) of representative colors are determined.

<Operation of Apparatus>

Division of Color Space

The color space division unit 205 determines a plurality of bins used to generate frequency distribution information in the frequency distribution generation unit 207. More specifically, the color space division unit 205 divides the Y/HS color space by setting thresholds in hue and saturation, and thresholds in luminance directions.

Since the luminance direction is defined by one dimension (linear), luminance values can be simply divided based on predetermined luminance thresholds. A case will be exemplified below wherein eight luminance levels are set. At this time, the luminance direction is divided into eight (P+1) regions (Y0 to Y7) based on seven (predetermined P) luminance thresholds between neighboring luminance values. Upon implementation in products, for example, a luminance level may be determined using, for example, upper 3 bits of a Y signal.

Figure 5:
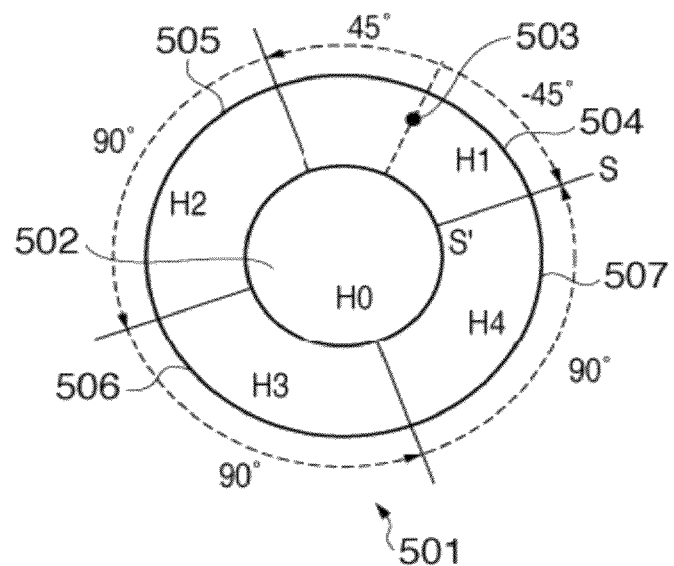
FIG. 5 is a view showing an example in which a hue circle is divided into a plurality of regions.

FIG. 5 is a view showing an example in which a hue circle 501 is divided into a plurality of regions, the hue circle 501 being defined with the hue (H) and the saturation (S). The hue circle 501 is divided into an achromatic region (low-saturation region) and chromatic region (high-saturation region). As described above, a distance in the radial direction in the hue circle can express saturation S. Saturation S becomes closer to achromatic colors such as white, gray, and black with decreasing distance to an origin of the hue circle. Conversely, saturation S becomes more brilliant chromatic colors with increasing distance from the origin. Hence, a predetermined saturation threshold S' is set. An region 502 (H0) indicates a range of an achromatic color, wherein the region 502 is the range that saturation S is smaller than the saturation threshold S' on the hue circle 501.

Divisions of the chromatic region will be described below. Hue H is expressed by a phase in the hue circle. Hence, the chromatic region can be divided by setting a plurality of hue thresholds. However, since different hue distributions appear for respective tile images, a problem is posed if the hue circle is divided with predetermined fixed hue thresholds.

Figure 6:
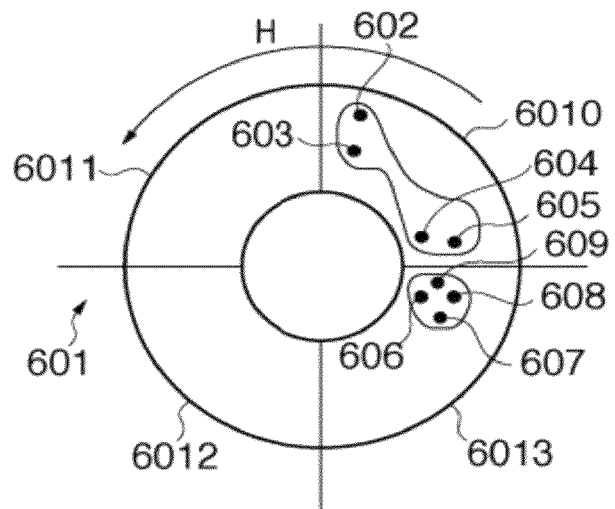
FIG. 6 is a view showing an example in case of fixed region divisions of the hue circle.

The problem is explained with FIG. 6. FIG. 6 is a view showing a hue circle 601 that is divided into four fixed regions to have hue thresholds of 0°, 90°, 180°, and 270° as boundaries. Points 602 to 609 are defined by plotting the hue and saturation values corresponding to pixels included in a certain tile image. In FIG. 6, the eight pixels 602 to 609 are determined as those included in hue ranges 6010 and 6013 based on the four regions which are set in advance.

However, as can be understood from the distribution of the eight pixels in FIG. 6, these pixels are preferably classified into two groups, i.e., a group including the pixels 604, 605, 606, 607, 608, and 609, and a group including the pixels 602 and 603. That is, when the boundaries of the regions are fixed, as described above, pixels to be classified as an identical hue region are unwantedly classified into different hue regions. In quantization processing after classification, pixels classified into different hue regions are substituted by different color information values. Hence, as a result, the pixels 604 and 605 and the pixels 606 to 608 are substituted by colors considerably different from actual colors. That is, the image quality of an image after color reduction unwantedly drops. Thus, the image processing apparatus according to the first embodiment adaptively determines hue thresholds for each target tile image.

Figure 7:
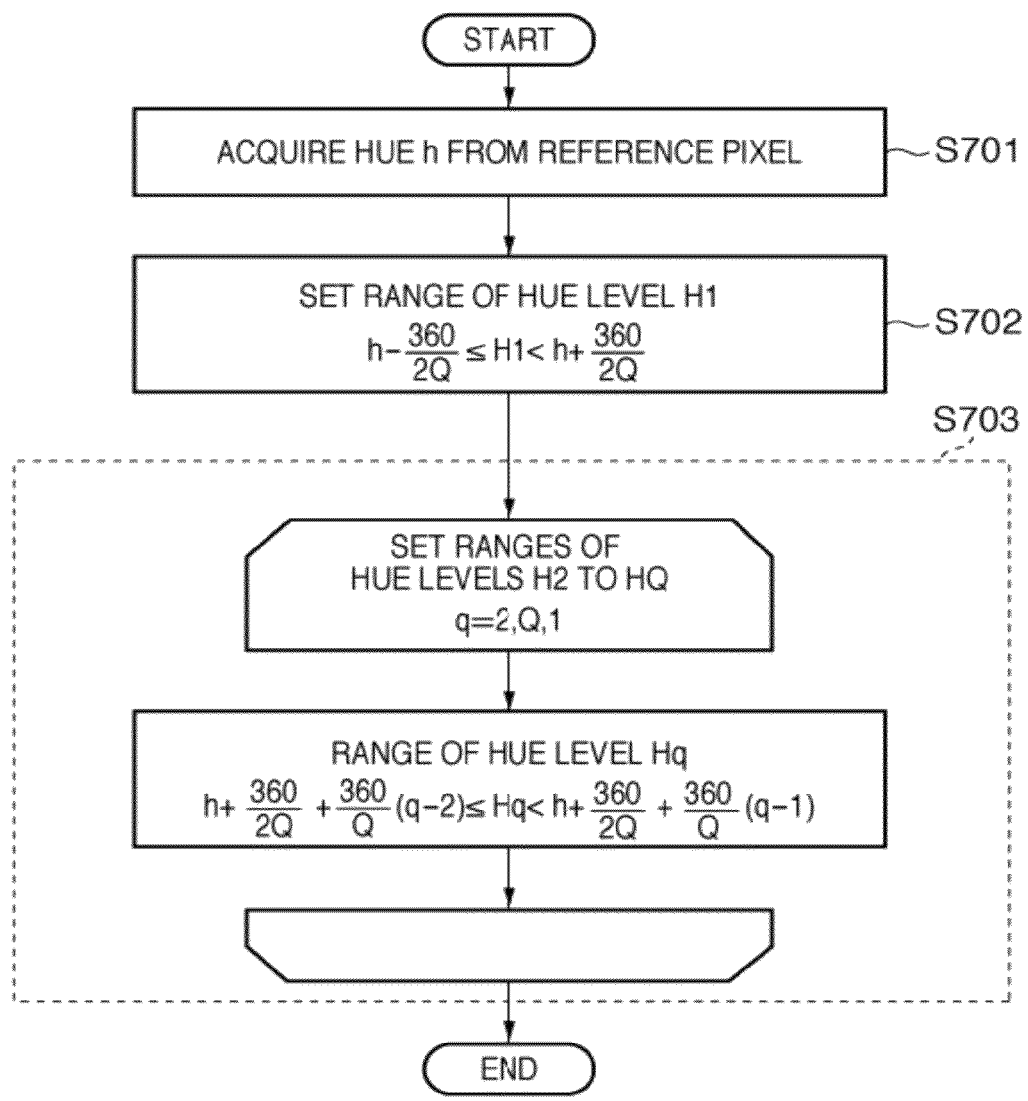
FIG. 7 is an operation flowchart for explaining region division processing of the HSV color space.

FIG. 7 is an operation flowchart showing the operation for dividing the chromatic region in the hue circle into a plurality of regions, the hue circle being defined with hue and saturation. Note that steps to be described below are implemented when the CPU 102 executes various control programs. As described above, the hue circle has already been divided into the achromatic region and chromatic region. A case will be examined below wherein the chromatic region is divided into Q regions. As a result, the hue circle is divided into (Q+1) regions (i.e. Q chromatic regions and one achromatic region).

In step S701, the CPU 102 acquires hue h from a reference pixel in a tile image of interest. As the reference pixel, a first pixel that is determined as a chromatic color (not included in H0) by scanning the tile image is used (a reference pixel determination unit). In FIG. 5, reference numeral 503 denotes an example of a hue value acquired from the reference pixel.

In step S702, the CPU 102 sets a hue range H1. Letting Q be the number of divisions in the hue direction of the chromatic region, the hue range H1 is assumed to be a range of ±(360/2Q) from the hue value h of the reference pixel. E.g. in FIG. 5, the hue range H1 (504) is a range of (hue value h of the reference pixel 503)±45° when the number of divisions of the chromatic region is Q=4. In other words the chromatic region is divided so that the hue value of the reference pixel is center of one of the divided regions.

In step S703, the CPU 102 respectively sets remaining hue ranges H2 to HQ. A case will be explained below wherein the hue circle is divided by equal angles. That is, the hue circle is divided for each (360/Q)°. FIG. 5 shows an example in which the number of divisions of the chromatic region is Q=4, and the chromatic region is divided into hue ranges of 90°. In FIG. 5, reference numerals 505, 506, and 507 respectively denote hue ranges H2, H3, and H4. The regions (the achromatic region H0 and the divided chromatic regions H1 to H4) divided in the hue circle 501 will be referred to as hue ranges hereinafter.

Generation of Frequency Distribution Information

Figure 8:
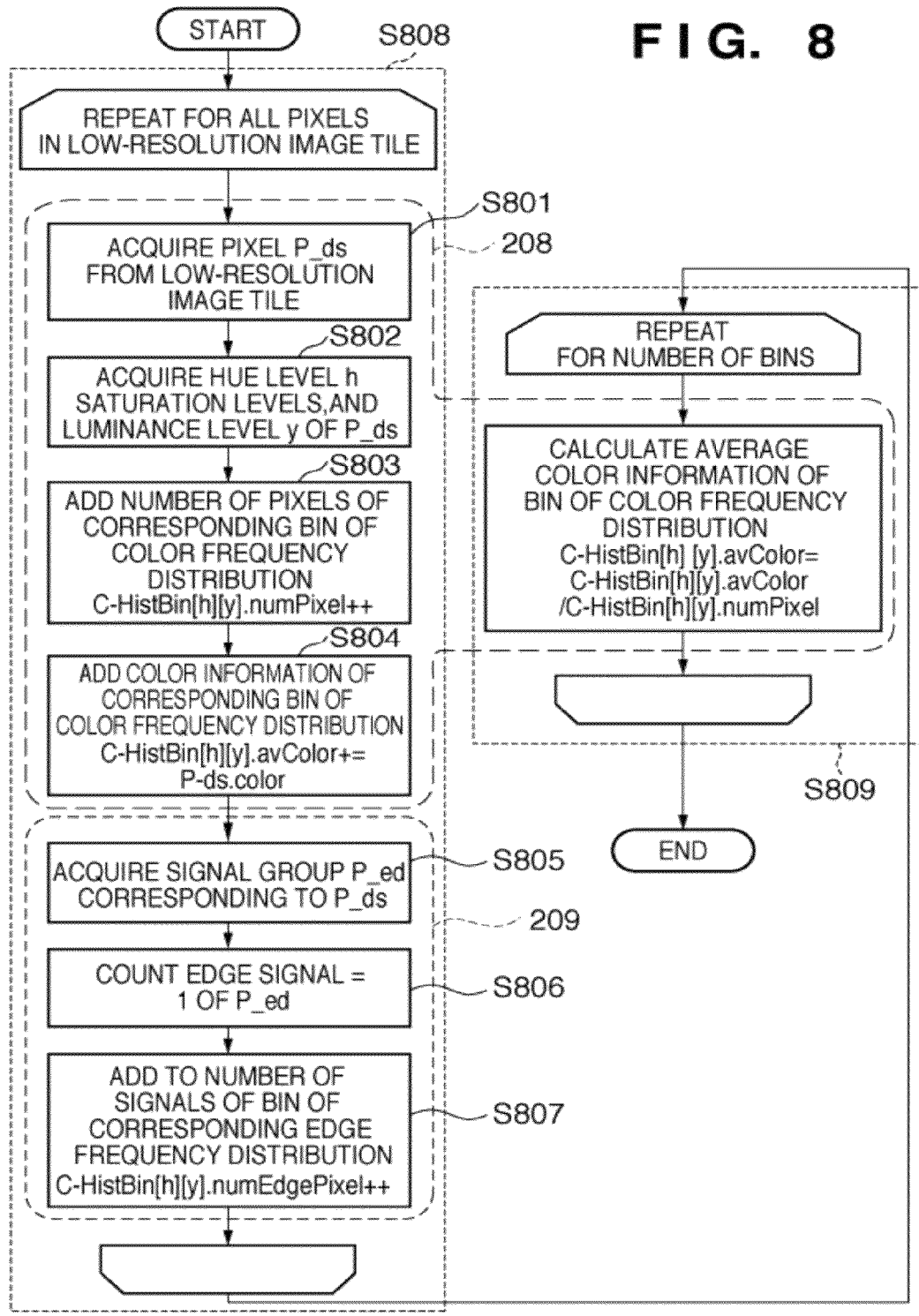
FIG. 8 is an operation flowchart for explaining frequency distribution generation processing.

Details of the frequency distribution generation processing will be described below with reference to FIG. 8. The flowchart can be largely divided into processing for respective pixels in a tile image (S808) and that for respective Bins (S809). Step S808 includes processes in steps S801 to S807 to be described below.

Note that steps S801 to S804 correspond to frequency distribution derivation processing of pixel values for all pixels in a low-resolution tile image, and are processed by the color frequency distribution generator 208. On the other hand, steps S805 to S807 correspond to frequency distribution derivation processing of pixel values for pixels in a tile image corresponding to an edge region, and are processed by the edge frequency distribution generator 209.

The frequency distribution generation unit 207 generates a two-dimensional matrix including luminance levels Y (Y0 to Y7) and hue ranges H (H0 to H4) set by the color space division unit 205, and counts the frequencies of occurrence of pixels and edge signals in title images included in respective matrix elements (to be referred to as bins hereinafter).

Figure 9:
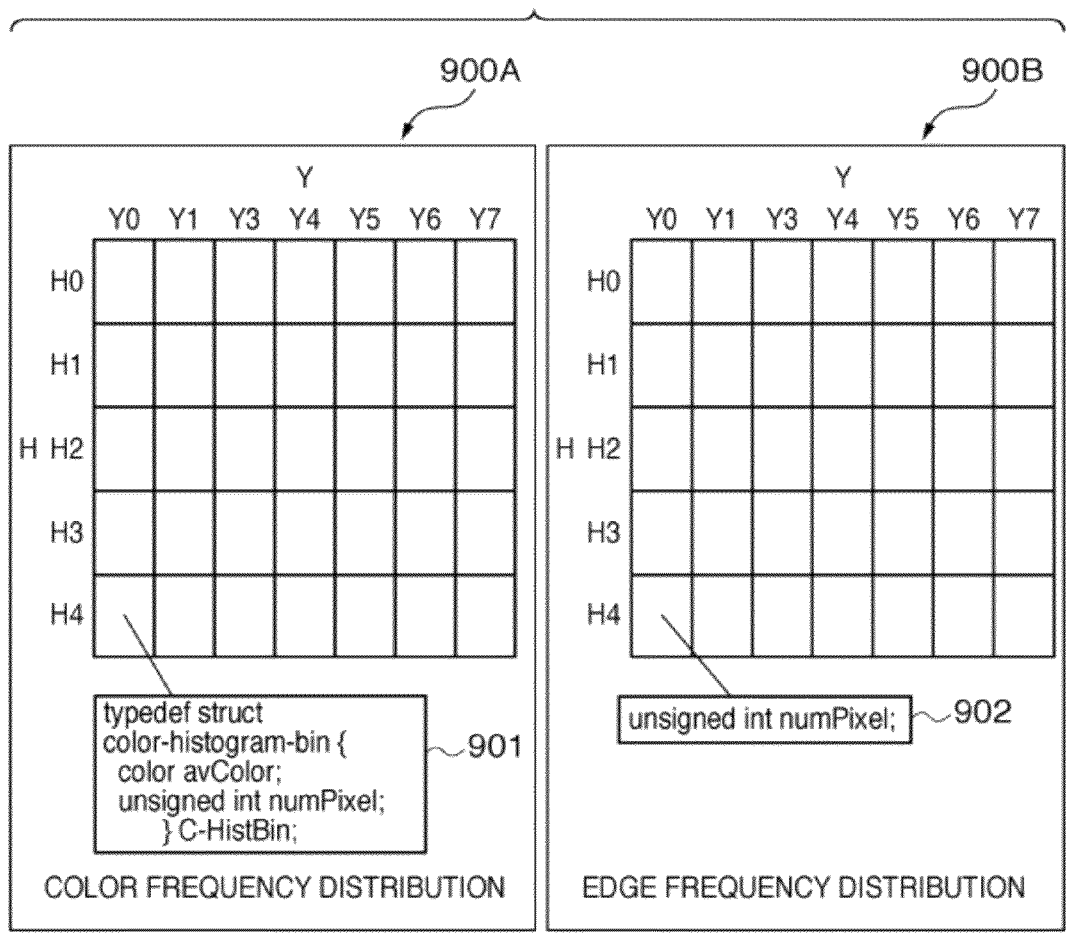
FIG. 9 is a view showing an example of the configuration of frequency distribution data used in a frequency distribution generation unit.

In FIG. 9, reference numeral 900A denotes a matrix for a color frequency distribution; and 900B, a matrix for an edge frequency distribution. Each bin of the color frequency distribution 900A stores the frequency of occurrence of pixels in a low-resolution image having color information of a luminance level and hue range corresponding to that bin, and an average value of pieces of color information corresponding to counted pixels. Reference numeral 901 denotes an example of a matrix declaration. Each bin of the edge frequency distribution 900B stores the frequency of occurrence of edge signals corresponding to pixels of a low-resolution tile image, which are counted in the corresponding bin of the color frequency distribution 900A. Reference numeral 902 denotes an example of a matrix declaration. As denoted by reference numeral 900C, these two frequency distributions are configured to exist as a pair, so that matrix positions of the two distributions correspond to each other.

In step S801, the color frequency distribution generator 208 acquires a pixel value of one pixel (to be referred to as P_ds hereinafter) from a low-resolution tile image. In step S802, the color frequency distribution generator 208 acquires a hue range and luminance level corresponding to the pixel P_ds. These hue range and luminance level are obtained by calculating a luminance value y and hue h and saturation s from the pixel value of the pixel P_ds, and determining the luminance level and hue range which are divided by the color space division unit 205 and to which the calculated luminance value y, hue h and saturation s belong. In other words, it is determined which of bins of the color frequency distribution 900A and the edge frequency distribution 900B the pixel P_ds belongs to.

In step S803, the color frequency distribution generator 208 increments the frequency of occurrence of pixels by 1 (frequency) in a bin of the color frequency distribution corresponding to the luminance level and hue range determined in step S802. In step S804, the color frequency distribution generator 208 adds color information of P_ds to that of the corresponding bin.

In step S805, the edge frequency distribution generator 209 acquires an edge signal group P_ed corresponding to a position equivalent to the pixel P_ds of the low-resolution image. Note that edge signals are generated from a tile image, as described above, and the tile image has a higher resolution than the low-resolution tile image. For this reason, a plurality of edge signals corresponds to P_ds. More specifically, when an input image used to generate edge signals is set to have 600 dpi, and a low-resolution image is set to have 300 dpi, four edge signals correspond to one pixel P_ds.

In step S806, the edge frequency distribution generator 209 counts the number of edge signals having a value "1" of P_ed. This corresponds to determination as to whether or not the pixel P_ds of the low-resolution image is included in an edge region. If the pixel P_ds of the low-resolution image is included in a background region or is located inside another region, all the corresponding edge signals assume a value "0". On the other hand, if P_ds is a pixel on a certain image boundary (edge), all the corresponding edge signals assume a value "1".

In step S807, the edge frequency distribution generator 209 adds the number of edge signals counted in step S806 to the frequency of occurrence of edge signals stored in a bin of the edge frequency distribution corresponding to the luminance level and hue range determined in step S802.

The aforementioned processes in steps S801 to S807 are repeated for all pixels of each low-resolution tile image. After that, in step S809, the frequency distribution generation unit 207 calculates an average of pieces of color information of pixels counted in each bin of the color frequency distribution. More specifically, the frequency distribution generation unit 207 divides the color information added to each bin in step S804 by the number of pixels in that bin added in step S803. This process is repeated for 40 (=8×5) bins.

FIG. 10 is a view showing examples of frequency distributions in correspondence with bins defined with hue regions and luminance levels. Reference numeral 1000A denotes a color frequency distribution (first frequency distribution) that is generated based on the low-resolution tile image 300B. On the other hand, reference numeral 1000B denotes an edge frequency distribution (second frequency distribution) which is generated based on the edge signal image 300C.

Determination of Representative Color and Substitution of Pixel

The representative color selection unit 210 determines representative colors based on information generated by the frequency distribution generation unit 207. In general, colors having higher frequencies of occurrence in a tile image are considered as important colors (representative colors) in the tile image. However, in practice, there is a color that is not important although it has a high frequency of occurrence.

Figure 11:
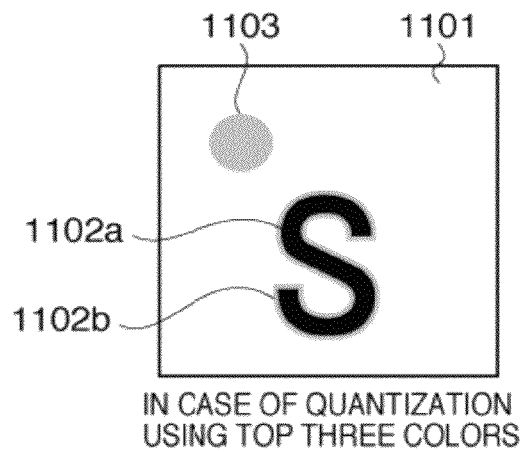
FIG. 11 is a view showing an example of the color-reduction processing result.

FIG. 11 shows an example of an image after pixel value substitution process is executed for the image 300A of FIG. 3 (after color reduction). If colors having top three frequencies of occurrence are simply determined as representative colors, the background color 301 (white), the character color 302 (black) and the blurred portion color (gray) are selected as representative colors when the number of pixels of the blurred portion (having gray color) around the region 302 is larger than the number of pixels of the region 303 (having reddish color). If the image 300A undergoes quantization (pixel substitution) with the selected representative colors (white, black and gray), a blur portion 1102b having gray color remains around a character region 1102a, and a region 1103 is unwantedly substituted by a different color (for example, gray) although that region is to be substituted by a reddish color. In other words, blurred portion may remain if colors with much frequencies of occurrence are simply determined as representative colors.

A color blur portion generally exists to be sandwiched between two color regions. For this reason, color information of the blur portion is often located at an intermediate position between luminance values of the two color regions. Also, the blur portion has an elongated shape along a region. That is, the blur portion normally exists on an edge region. Hence, the first embodiment eliminates the blur portion using the aforementioned features of the color blur portion, and determines important colors as representative colors.

Figure 12:
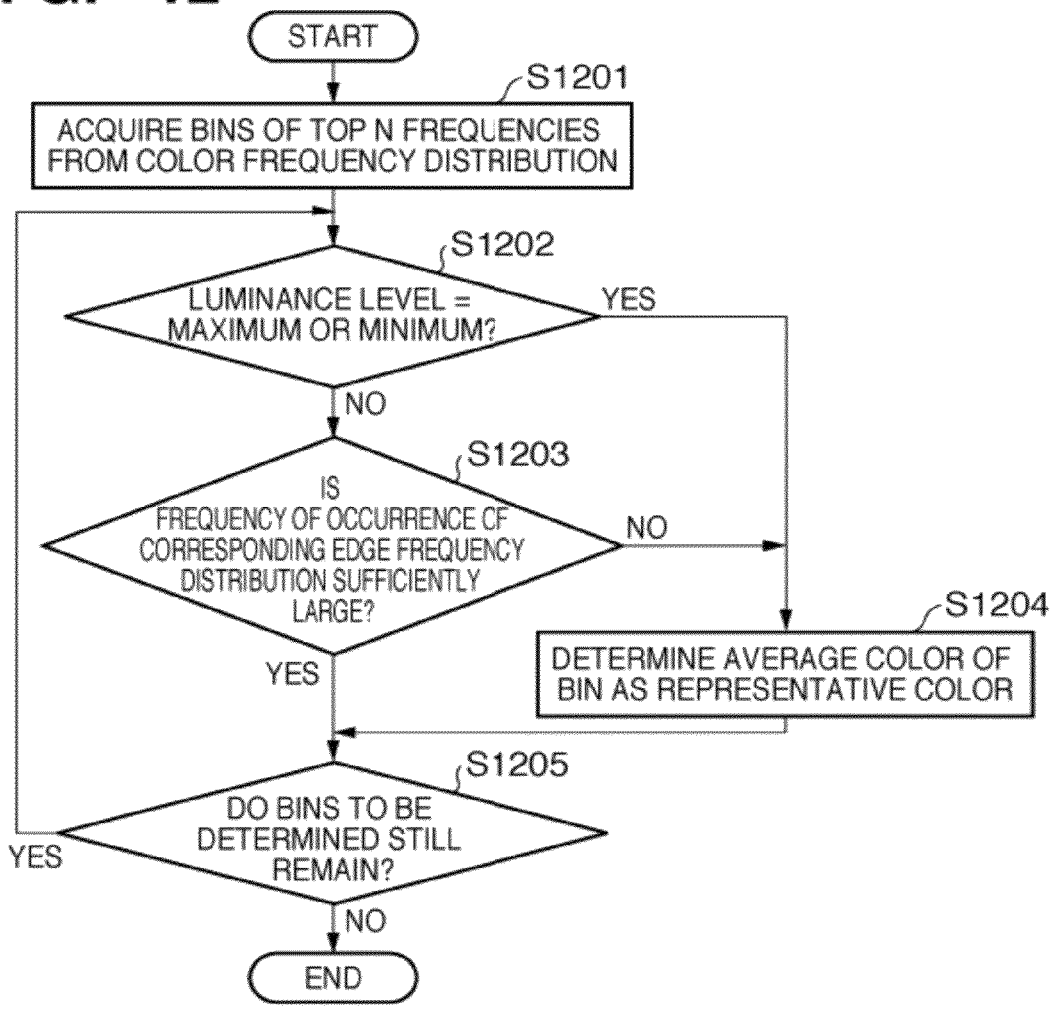
FIG. 12 is an operation flowchart for explaining representative color determination processing.

FIG. 12 is a detailed flowchart of the representative color selection processing. Note that the number of representative color candidates may be a predetermined value designated in advance, or representative color candidates corresponding to the predetermined number of pixels or more may be selected. Alternatively, the predetermined number of representative color candidates may be selected, and a bin having the number of pixels equal to or smaller than an empirically calculated threshold may be excluded from candidates.

In step S1201, the representative color selection unit 210 acquires bins having top n frequencies from the color frequency distribution. In the first embodiment, bins having top three frequencies are selected from each of the regions (hue ranges H0 to H4) of the hue circle, and are determined as representative color candidate bins. By applying such rule to the color frequency distribution 1000A shown in FIG. 10, bins (Y7, H0), (Y1, H0), and (Y5, H0)

are selected from the hue range H0, and a bin (Y2, H1)

is selected from the hue range H1. From the hue ranges H2, H3, and H4, no bin is selected since the frequency of occurrence of pixels is zero.

Note that the bin (Y1, H0) corresponds to the black character region 302 in the image 300A, and the bin (Y7, H0) corresponds to the white background region 301 in the image 300A. The bin (Y5, H0) corresponds to a part of a gray blur portion that is generated around the black character region in the image 300A. The bin (Y2, H1) corresponds to the reddish image region 303 in the image 300A.

The representative color selection unit 210 checks in step S1202 if a candidate bin of interest has a maximum or minimum luminance level Y among all candidate bins. If YES in step S1202, the process advances to step S1204; if NO in step S1202, the process advances to step S1203. For example, since the bin (Y1, H0) has the lowest luminance level among the candidate bins, YES is determined in step S1202, and the process advances to step S1204. Since the bin (Y7, H0) has the highest luminance level among the candidate bins, the process advances to step S1204. On the other hand, since the luminance levels of the bins (Y5, H0) and (Y2, H1) are neither maximum nor minimum among the candidate bins, NO is determined in step S1202, and the process advances to step S1203.

The representative color selection unit 210 determines in step S1203 with reference to the frequency of occurrence of edges in a bin of the edge frequency distribution 1000B corresponding to the candidate bin of interest if the frequency of occurrence is larger or smaller than a threshold. If the frequency of occurrence is smaller than the threshold, the process advances to step S1204; if it is larger than the threshold, the process advances to step S1205. That is, this process determines if color information of the candidate bin of interest is generated around an edge. Note that the threshold is sufficiently larger than the number of pixels of each bin of the color frequency distribution. This is because an image from which edge signals are extracted has a higher resolution than an image from which the color frequency distribution is extracted, and a plurality of signals corresponds to one pixel of the low-resolution image. For this reason, when the number of edge signals generated is sufficiently larger than the number of pixels of the low-resolution image, it cannot be determined that the candidate bin of interest exists in a small region (edge). In this case, a threshold $\alpha$ is set to be twice the number of pixels of a bin of the color frequency distribution. Note that the threshold $\alpha$ may be determined according to the degree of reduction in the low-resolution conversion unit 203. For example, when L×L pixels correspond to one pixel, the threshold $\alpha$ may be set based on the number of the pixels of a bin of the color frequency distribution and the value L. In other words, the candidate bin that the proportion of edge pixels is high will not be selected as a representative color because it is likely that the candidate bin having much edge pixels is a blurred portion around a character image.

In the example of FIG. 10, since the frequency of the bin (Y2, H1) in the color frequency distribution is "34" and that of the bin (Y2, H1) in the edge frequency distribution is "36", it is determined that the edge frequency is not sufficiently large. For this reason, the process advances to step S1204. On the other hand, the number of generated pixels of the bin (Y5, H0) in the color frequency distribution is "72", and that of the bin (Y5, H0) in the edge frequency distribution is "160". For this reason, it is determined that the edge frequency is sufficiently large, and the process advances to step S1205.

The representative color selection unit 210 determines in step S1205 if all representative color candidate bins have been checked. If YES in step S1205, the process advances to "end"; if NO in step S1205, the process returns to step S1202. With the above processing, representative colors can be determined. For example, three (N) bins (Y7, H0), (Y1, H0), and (Y2, H1)

are selected as those corresponding to representative colors from the color frequency distribution in FIG. 10. Then, representative colors are derived based on, for example, the average pixel values of each of these selected bins. Note that representative colors may be determined based on the average pixel values of pixels included in respective bins in a tile image.

After that, the color quantization unit 211 executes quantization processing for calculating inter-color distances between each pixel of input image data and the respective determined representative colors, and substituting that pixel by a representative color having a smallest distance. In other words, each pixel of input image data is substituted by most similar representative color. As the inter-color distance, a Euclidean distance based on RGB pixel values between the pixel of interest and representative color may be used. However, the present invention is not limited to such specific color space and distance calculation method. Also, a conversion table that matches human visual characteristics may be prepared in advance, and substitution may be done based on that table. As a result of the quantization processing, color-reduced tile image data 300D shown in FIG. 3 is obtained. When the aforementioned processing is independently executed for respective tile images, and the tile images are coupled, color-reduced image data (second image data) is obtained.

As described above, according to this embodiment, since the color frequency distribution and edge frequency distribution are combined to decide bins used in decision of representative colors, blurred colors of regions can be excluded from the representative colors. Thus, more suitable color-reduction processing can be implemented, and an output image with high image quality can be easily obtained.

Other Embodiments

In addition, a hue value and a saturation value of HSL color space may be used in substitution for the hue value and the saturation value of HSV color space.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-097395, filed Apr. 13, 2009, and No. 2010-076204, filed Mar. 29, 2010, which are hereby incorporated by reference herein in their entirety.

What is claimed is:

1. An image processing apparatus comprising:
    a reduced-scale image generation unit configured to generate a reduced-scale image of first image data;
    a color space division unit configured to determine a plurality of bins by dividing predetermined color space, the plurality of bins being used for generating frequency distributions;
    a first frequency distribution generation unit configured to generate, for all pixels included in the reduced-scale image, a first frequency distribution by counting a number of pixels that belong to each of the bins determined by said color space division unit;
    a detection unit configured to detect an edge region from the first image data;
    a second frequency distribution generation unit configured to generate, for pixels included in the edge region detected by said detection unit, a second frequency distribution by counting a number of pixels that belong to each of the bins determined by said color space division unit;
    a determination unit configured to select N bins based on the generated first frequency distribution and the generated second frequency distribution, and configured to determine N types of pixel values respectively corresponding to the selected N bins; and
    a substitution unit configured to substitute each of pixels included in the first image data using the determined N types of pixel values.

2. The apparatus according to claim 1, further comprising a reference pixel determination unit configured to determine a reference pixel by scanning the reduced-scale image, saturation of the reference pixel being larger than a predetermined threshold,
    wherein said color space division unit sets a plurality of regions in a hue circle by determining a region of the hue circle that a saturation is smaller than the predetermined threshold and by dividing, in a hue direction, the region of the hue circle that a saturation is larger than the predetermined threshold based on the hue value of the reference pixel determined by said reference pixel determination unit, and configured to set a plurality of luminance levels by dividing a luminance direction, and configured to determine the plurality of bins based on the set regions of the hue circle and the set luminance levels.

3. The apparatus according to claim 2, wherein said color space division unit sets (Q+1) regions in the hue circle by determining one region of the hue circle that the saturation is smaller than the predetermined threshold and by dividing, in the hue direction, the region of the hue circle that the saturation is larger than the predetermined threshold into Q small regions based on the hue value of the reference pixel, and sets (P+1) luminance levels by dividing the luminance direction with predetermined P luminance thresholds, and determines (P+1)×(Q+1) bins based on the set (Q+1) regions of the hue circle and the set (P+1) luminance levels.

4. The apparatus according to claim 2, further comprising a color space conversion unit configured to derive hue and saturation values of an HSV color space and a luminance value of a YUV color space from pixel values of each pixel included in the reduced-scale image.

5. The apparatus according to claim 1, wherein said substitution unit substitutes each of pixels included in the first image data by a pixel value having a smallest Euclidian distance from the determined N types of pixel values.

6. The apparatus according to claim 2, wherein said reference pixel determination unit scans pixels included in the reduced-scale image in turn, and determines, as the reference pixel, a first pixel of which the saturation is larger than the predetermined threshold.

7. The apparatus according to claim 1, wherein said reduced-scale image generation unit generates the reduced-scale image by converting L×L pixels of the first image data into one pixel, and
    said determination unit selects the N bins based on the value L and ratios between the numbers of pixels included in bins corresponding to the first frequency distribution and the second frequency distribution, and determines the N types of pixel values respectively corresponding to the selected N bins.

8. The apparatus according to claim 1, wherein said determination unit determines the N types of pixel values based on average pixel values of each of the selected N bins or based on average pixel values of pixels in the reduced-scale image, which are respectively included in the selected N bins.

9. The apparatus according to claim 1, further comprising an input unit configured to input an image; and a division unit configured to divide the input image into a plurality of tile images,
   wherein the first image data is respective one of the tile images divided by said division unit.

10. A method of controlling an image processing apparatus, the method comprising:
   using a processor to perform the following:
   a reduced-scale image generation step of generating a reduced-scale image of first image data;
   a color space division step of determining a plurality of bins by dividing predetermined color space, the plurality of bins being used for generating frequency distributions;
   a first frequency distribution generation step of generating, for all pixels included in the reduced-scale image, a first frequency distribution by counting a number of pixels that belong to each of the bins determined in said color space division step;
   a detection step of detecting an edge region from the first image data;
   a second frequency distribution generation step of generating, for pixels included in the edge region detected in said detection step, a second frequency distribution by counting a number of pixels that belong to each of the bins determined in said color space division step;
   a determination step of selecting N bins based on the generated first frequency distribution and the generated second frequency distribution, and of determining N types of pixel values respectively corresponding to the selected N bins; and
   a substitution step of substituting each of pixels included in the first image data using the determined N types of pixel values.

11. A non-transitory computer-readable storage medium storing a computer program, wherein the computer program causes a computer to function as:
   a reduced-scale image generation unit configured to generate a reduced-scale image of first image data;
   a color space division unit configured to determine a plurality of bins by dividing predetermined color space, the plurality of bins being used for generating frequency distributions;
   a first frequency distribution generation unit configured to generate, for all pixels included in the reduced-scale image, a first frequency distribution by counting a number of pixels that belong to each of the bins determined by said color space division unit;
   a detection unit configured to detect an edge region from the first image data;
   a second frequency distribution generation unit configured to generate, for pixels included in the edge region detected by said detection unit, a second frequency distribution by counting a number of pixels that belong to each of the bins determined by said color space division unit;
   a determination unit configured to select N bins based on the generated first frequency distribution and the generated second frequency distribution, and configured to determine N types of pixel values respectively corresponding to the selected N bins; and
   a substitution unit configured to substitute each of pixels included in the first image data using the determined N types of pixel values.

* * * * *